US006885461B2

(12) United States Patent
Tang

(10) Patent No.: US 6,885,461 B2
(45) Date of Patent: Apr. 26, 2005

(54) WEIGHTED LEAST-SQUARE INTERFEROMETRIC MEASUREMENT OF MULTIPLE SURFACES

(75) Inventor: Shouhong Tang, Tucson, AZ (US)

(73) Assignee: Phase Shift Technology, Inc., Tucson, AZ (US)

( * ) Notice: Subject to any disclaimer, the term of this patent is extended or adjusted under 35 U.S.C. 154(b) by 247 days.

(21) Appl. No.: 10/308,484

(22) Filed: Dec. 3, 2002

(65) Prior Publication Data

US 2004/0105097 A1 Jun. 3, 2004

(51) Int. Cl.$^7$ ................................................ G01B 9/02
(52) U.S. Cl. ..................................... 356/514; 356/503
(58) Field of Search ............................... 356/450, 496, 356/498, 503–506, 511–515, 517, 519

(56) References Cited

U.S. PATENT DOCUMENTS

| | | |
|---|---|---|
| 4,594,003 A | 6/1986 | Sommargren |
| 5,452,088 A | 9/1995 | Ai |
| 5,473,434 A | 12/1995 | de Groot |
| 5,488,477 A | 1/1996 | de Groot |
| 6,359,692 B1 | 3/2002 | de Groot |
| 6,717,680 B1 * | 4/2004 | Kuchel et al. .............. 356/514 |

OTHER PUBLICATIONS

B Bruning J.H., Herriott D.R., Gallagher J. E. Rosenfeld D.P, Ehite A.D, and Bran Brangaccio D.J., "Digital wavefront measuring interferometer for testing optical surfaces and lenses", Appl. Opt. 13, 2693–2703(1974).
C.L. Koliopoulos, "Interferometric optical phase measurement techniques," Ph.D. Fissertation, Optical Sciences Center, Univ. Of Arizona (1981).
K. Kinnstaetter, A. W. Lohmann, J. Schwider, and N. Streibl, "Accuracy of phase shifting interferometry," Appl. Opt. 27, 5082–5089(1988).
P. de Groot, "Measurement of transparent plates with wavelength–tuned phase–shifting interferometry," App. Optics, vol.39, No. 16,2658–2663(2000).
K. Okada, H. Sakuta, T. Ose, and J. Tsujiuchi, "Separate measurements of surface shapes and refractive index inhomogeneity of an optical element using tunable–source phase shifting interferometry," App. Optics, vol.29, No. 22, 3280–3285(1990).
K. Freischlad and C.L. Koliopoulos, "Fourier description of digital phase–measuring interferometry," J. Opt. Soc. Am. A7, 542–551(1990).
S. Tang, "Generalized algorithm for phase shifting interferometry", SPIE, Denver, Jul. 1996.
G. Lai and T. Yatagai, "Generalized phase–shifting interferometry," J. Opt. Soc. Am. A8, 822–827(1991).

* cited by examiner

Primary Examiner—Andrew H. Lee
(74) Attorney, Agent, or Firm—LaValle D. Ptak

(57) ABSTRACT

A system and method are provided for obtaining mapping profiles of transparent objects having a plurality of reflective surfaces. The object, the surfaces of which are to be mapped, is placed in an unequal path interferometer including a reference surface located a predetermined distance from the object. Coherent light is supplied in the interferometer from a tunable source; and multiple optical interferograms for each of the plurality of reflective surfaces are simultaneously recorded. These interferograms are simultaneously extracted through the use of a dynamically generated weighted least-square fitting technique; which separates interferograms from a set of superimposed interferograms to obtain a given interferogram for any one of the surfaces, free from errors resulting from the existence of the other interferograms.

26 Claims, 3 Drawing Sheets

WEIGHTED LEAST-SQUARE INTERFEROMETRIC MEASUREMENT OF MULTIPLE SURFACES

BACKGROUND

This invention pertains to the field of interferometric profilometry or, more precisely, to the field of wave length-tuned phase-shifting interferometry. The invention is directed to a system and method capable of extracting multiple surface height information, simultaneously, from a set of phase-shifted, superimposed interferograms.

Phase shifting interferometry (PSI) is a highly accurate and efficient phase measuring method applied to a variety of applications including optical testing, surface profilometry, surface roughness estimation, and surface displacement measurement. The fundamental concept of PSI is that the phase of an interferogram can be extracted accurately by acquiring a set of phase-shifted interferograms. The phase shifts between interferograms are produced by changing the optical path difference (OPD) between the measurement surface and a reference surface. The phase shifts also can be achieved by changing the wave length, if the OPD between the measurement surface and the reference surface is not zero.

The United States patent to DeGroot U.S. Pat. No. 5,473,434 is directed to a phase shifting interferometer and method for achieving surface topography measurements. In the system of this patent, the phase shifts are produced by an assembly which mechanically physically displaces components of an interferometer to vary the length of the cavity. This patent is directed to an interferometric measurement of the surface topography of a single surface.

The United States patent to Sommargren U.S. Pat. No. 4,594,003 also is directed to an interferometer method and system to provide a phase map representing the optical path differences between a reference surface and an object surface. In the system disclosed in the '003 patent, the phase differences are produced by utilizing a diode laser light source, the wave length of which is varied; so that the phase difference between the two wave fronts producing the interference pattern is modulated by a known amount. The modulated interference pattern then is sensed with an imaging device; and the signals are processed to provide the desired phase map.

The systems of the U.S. Pat. Nos. 4,594,003 and 5,473,434 described above are representative of systems which are capable of providing phase measurements where there is only one surface involved. A number of applications exist, however, where the front and back surfaces of an object both impose interferograms on the recording plane simultaneously. In situations where this condition exists, most well known phase-shifting algorithms in PSI lose their ability to extract any individual phases from a set of phase-shifted superimposed interferograms.

To measure objects with multiple reflective surfaces, such as a transparent plate, the algorithms employed need to have the ability of extracting phases of any underlying interferogram from a set of intensity frames with superimposed interferograms. One such system for accomplishing this is described in the patent to DeGroot U.S. Pat. No. 5,488,477. This patent is directed to a PSI system for measuring the front and back surface topography of transparent objects which have substantially parallel surfaces. A relatively complex mathematical determination is employed in this patent to separate interference contributions due to the multiple reflections of the two parallel surfaces of the object. Among the procedures which are required by this patent are the reversing of the orientation of the object between two successive interference measurements. This then is followed by mathematical analysis or calculations to provide the desired profiles of the two different surfaces. A significant disadvantage of the system and method disclosed in this patent is the requirement of the reversing of the orientation of the object between measurements.

The United States patent to DeGroot U.S. Pat. No. 6,359,692 is directed to another method and system for profiling objects having multiple reflective surfaces. In the system and method of this patent, a phase-shifting algorithm using a Fourier transform, operating in conjunction with a Fizeau interferometer, is designed to extract the phases of a selected one of the multiple interference patterns produced by the different surfaces of the object. The algorithm is designed to select the patterns for only one of the surfaces. The algorithm then must be changed in order to select corresponding patterns for the other of the surfaces, while rejecting the patterns from the first surface. Different sets of measurements must be made for each of the surfaces employing a different algorithm to effect the desired filtering, so that comprehensive outputs can be obtained.

To measure objects with multiple reflective surfaces such as a transparent plate, any algorithm used must have the ability of extracting phases of an underlying interferogram from a set of intensity frames with superimposed interferograms. This is what is attempted by use of the Fourier transform algorithm of DeGroot '692. As mentioned above, however, this requires selecting a different Fourier transform algorithm for each of the surfaces of a multiple surface object. In general, a large number of intensity frames are needed, especially in case of measuring a thin translate plate (thickness<1 mm). If a measuring system cannot produce enough intensity frames, this algorithm may lose its ability to separate an interferogram of interest from a set of superimposed interferograms.

An algorithm which uses least-square fitting techniques to separate the front surface, back surface and thickness of a plate in PSI was reported by Ocada et al. in 1990 in a paper in *Applied Optics*, Vol.29, No.22, 1 Aug., 1990, pp. 3280 to 3285. The rms errors of the measurement for the surface shape are l/50 wavelengths in his paper. This measurement accuracy, however, is very difficult to achieve. One reason is that positioning of both the calibration object and the measurement object must be done with high precision. Even though there is a theoretical accuracy to this level, such a measurement accuracy has not been achieved in industrial applications. In addition, the high precision positioning requirements for accomplishing the types of results theoretically set forth in the Ocada paper preclude use of the Ocada system and method in a production line operation.

It is desirable to provide a method and system for measuring multiple reflective surfaces which overcomes the disadvantages of the prior art noted above, which is able to achieve sub-nanometer measurement accuracies, and which does not require high precision positioning requirements.

SUMMARY OF THE INVENTION

It is an object of this invention to provide an improved method and apparatus for extracting multiple surface height information simultaneously from a set of phase-shifted superimposed interferograms.

It is another object of this invention to provide improved phase mapping of multiple surfaces simultaneously.

It is still another object of this invention to provide an improved phase mapping simultaneously of multiple surfaces by utilizing an improved least-square fitting technique to separate selected interferograms from a set of superimposed interferograms.

It is a further object of this invention to dynamically generate a weighting factor for use in a least-square fitting technique to separate superimposed interferograms produced from multiple surfaces to produce individual phase maps for each of the surfaces.

In accordance with a preferred embodiment of the invention, a method is provided for the measurement of the surface profile or surface map of an object with multiple reflective surfaces. A measurement system, in the form of an unequal path length interferometer, is employed with a turnable laser source. The measuring object is positioned in the system so that the phase shift speed of all of the interferograms of interest are separated on the recording plane during acquisition. One or more of the phase shift speeds is calibrated to a known speed; and a set of superimposed interferograms are acquired with wavelength shifting of the tunable source. A weighting factor is determined for use in a weighted least-square fitting algorithm; and this algorithm is used to extract phases of all of the interferograms of interest, simultaneously, from the set of superimposed interferograms. Finally, the extracted phases of all of the interferograms of interest are provided to produce profiles of the surface shapes of all of the surfaces of interest, along with the plate thicknesses.

DETAILED DESCRIPTION

Figure 1:
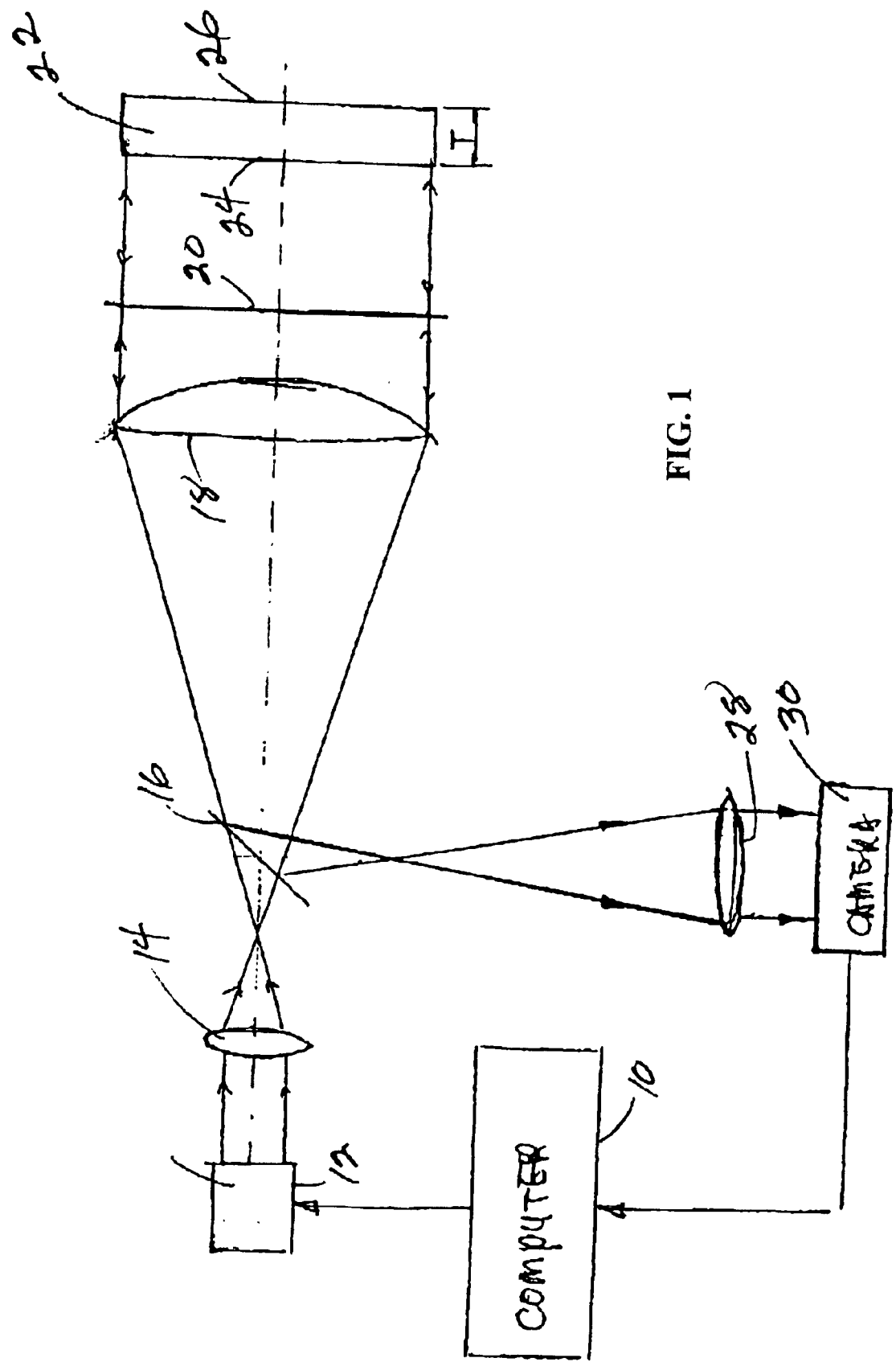
FIG. 1 is a schematic representation of a Fizeau interferometer used in practicing a preferred embodiment of the invention.

Reference now should be made to the drawings, in which the same or similar components are provided with the same reference numbers throughout the different figures. Before entering into a detailed discussion of the manner of operation of the method and apparatus of the invention, it is to be noted that the optics which are employed are known, and have been utilized with varying degrees of success for surface profiling of single and multiple surface objects in PSI systems.

The preferred embodiment of the method of the invention, used in conjunction with an unequal path length interferometer (such as a Fizeau or Twyman-Green interferometer), simultaneously extracts phases of all of the individual interferograms from a set of intensity frames, and records superimposed interferograms generated with wave fronts reflected from multiple reflective surfaces. These intensity frames are acquired sequentially, by changing the wavelength in a measurement system. The wavelength can be changed mechanically, or, preferably, with a tunable laser light source.

The method takes advantage of the fact that the phase shift which results from the wavelength shift for a given interferogram is proportional to the OPD of that interferogram. In other words, the phases of each of the interferograms in the superimposed interferograms shift at different speeds during acquisition. The method of the preferred embodiment of this invention also takes advantage of the fact that the solutions of the least-square fitting technique (which is used and which is described in greater detail subsequently) with respect to an orthogonal basis, are completely independent of each other. As a consequence, the underlying phases of interferograms carried with the solutions are fully separated also.

In general, the system and method of the preferred embodiment of the invention produces a phase map or profile for each interferogram from a set of superimposed interferograms. If a particular interferogram corresponds to the OPD between a measuring surface and the reference plane, the phase map (mapping profile) of this particular interferogram represents the shape of the measuring surface. If an interferogram corresponds to the OPD between the front surface and the back surface of a plate (the object being measured), the phase map of this interferogram represents the thickness, or the distribution of the refractive index, of the plate. As a consequence, the method and system disclosed can be used to measure or profile surfaces, plate thickness, and refractive index in homogeneity of an optical element or object from superimposed, multiple interferograms by using PSI.

The method of the preferred embodiment is fully capable of separating multiple interferograms (greater than three) superimposed on the recording plane, as long as the phase shift speeds of these interferograms are different during acquisition, and there are enough intensity frames recorded. Consequently, the method is capable of measuring shapes of multiple reflective surfaces (greater than two). In addition, the method is capable of measuring multiple plate thicknesses.

FIG. 1 is a schematic diagram of a system used to simultaneously measure and provide a phase profile of both the front 24 and back 26 surfaces of a transparent measurement object 22. The object 22 may be a glass plate or a thin semiconductor wafer (on the order of 1 micron thick), or any other suitable object. As shown in FIG. 1, the interferometric system which is employed is a Fizeau interferometer controlled by a computer 10 to operate a tunable laser light source 12. The beam of light from the laser 12 is supplied through a focusing lens 14 to a beam splitter 16, from which the light passes through a collimating lens 18 to supply coherent light to a reflective reference surface 20 and to the measurement object 22. It should be noted that only a single surface is shown for the reference surface 20. This surface, however, may be part of a reference flat, the other surface of which may be coated with a non-reflective coating, or the other surface may have be tilted with respect to the reflective surface 20; so that reflections from this other surface do not take part in any subsequent measurements. The manner in which this is accomplished to provide a single reference surface is well known, and is not further described here.

The reflected light beams are directed by the beam splitter 16 to an imaging lens 28 which supplies, simultaneously, multiple interferograms to a CCD camera 30 or other suitable recording plane. The camera 30 additionally may include a frame grabber for storing images detected by the camera; or the computer 10 may be configured to provide this function. In any event, the images obtained by the camera 30 are supplied to the computer 10 for processing to produce the desired profiles in a suitable form for immediate display, or storage for subsequent utilization.

Figure 2:
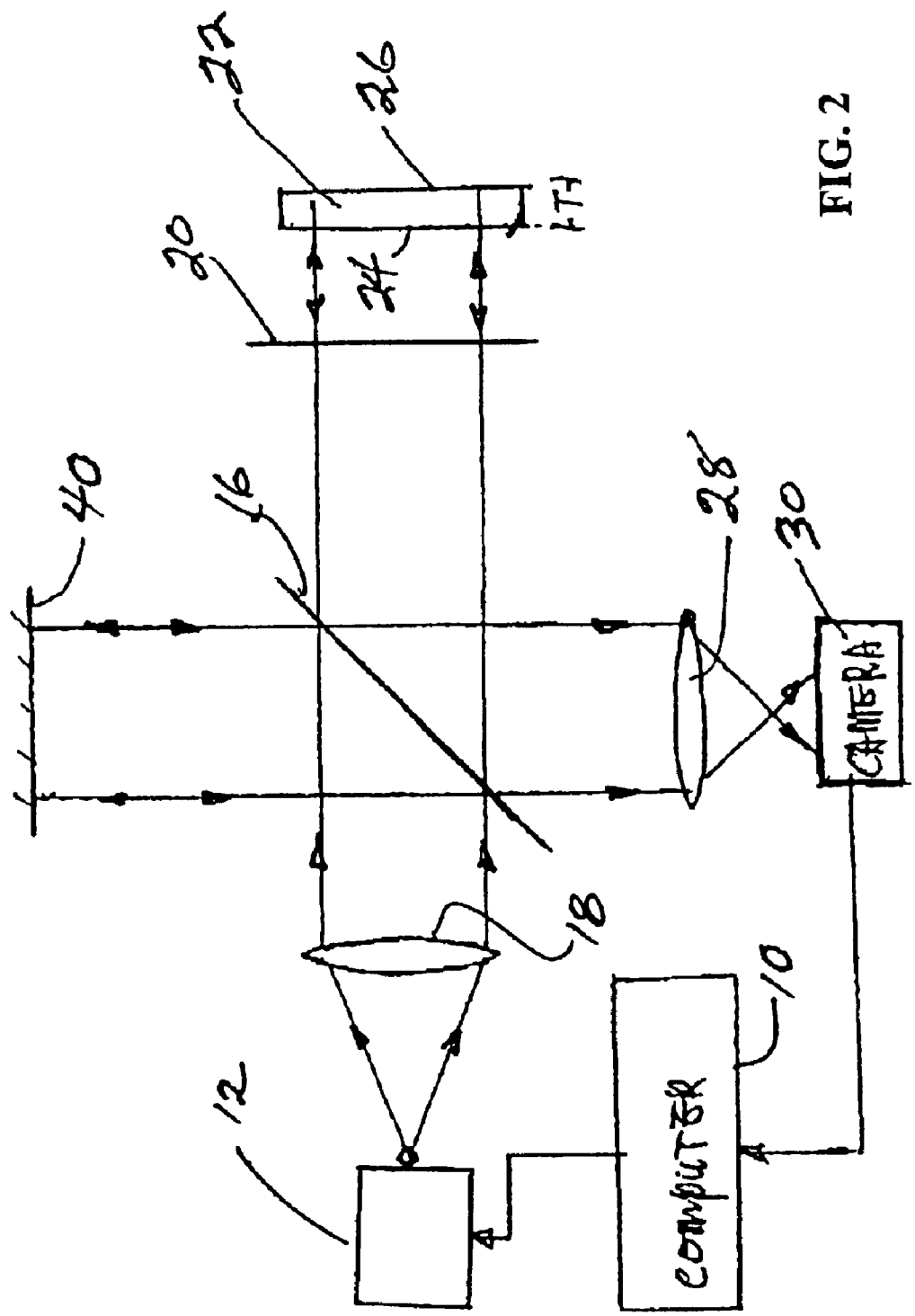
FIG. 2 is a schematic diagram of a Twyman-Green interferometer also used in practicing a preferred embodiment of the invention.

FIG. 2 is a diagrammatic representation of a Twyman-Green interferometer which also may be used to practice the preferred embodiment of the invention, as well as the Fizeau interferometer FIG. 1. Those components of FIG. 2 which are the same or similar to components of the Fizeau interferometer of FIG. 1 are designated with the same reference numbers. Once again, the object (a transparent glass plate or thin semiconductor wafer 22) which is subject to the measurements is located as indicated in the Fizeau interferometer of FIG. 1.

A computer 10 is employed to operate the tunable light source laser 12, and to process the captured interferograms from the CCD camera 30, as described previously in conjunction with FIG. 1. The tunable laser light source 12 supplies a beam of light at a desired frequency through a focusing lens 18, which is employed to focus and collimate the light from the laser light source 12. The light beam then is supplied through a beam splitter 16 to the reference flat 20 and the test piece or object 22, upon which measurements are to be made.

In a Twyman-Green interferometer, another reference flat or surface 40 is provided to receive reflections from the beam splitter 16, as indicated in FIG. 2; and the return beams are directed by the beam splitter 16 to the focusing lens 28, and ultimately, to the camera 30, as described previously in conjunction with FIG. 1. In all other respects, the operation of the system shown in FIG. 2 is identical to one described previously for FIG. 1.

It should be noted that the OPD between either of the measuring surfaces 24 and 26 and the reference surface 20 in the measurement system must be greater than zero. The phase shift speeds of every individual interferogram during the wavelength shifting of the tunable laser source 12 must be different from each other in the recording plane at the camera 30, irrespective of whether the phase shift speeds exceed the Nyquist limit. By establishing these parameters, the method disclosed in greater detail subsequently extracts the phases of each of the individual interferograms from a set of superimposed interferograms, so long as the phase shift speed of the given interferogram to be measured is different from that of any other interferogram in the set of superimposed interferograms. The manner in which the superimposed interferograms are recorded is not significant, so long as the phase shifts of the given interferograms are known.

It is not necessary for the phase shifts between consecutive recorded intensity frames to be constant. This method may be used in any measurement system, so long as the system is capable of producing a set of intensity frames which satisfy the requirements of the method outlined above. As noted, a tunable coherent light source, as provided by the tunable laser 12 and the optics shown in both FIGS. 1 and 2, provides a convenient means to acquire a set of superimposed interferograms. It is not, however, the only way to do this. For example, a system with multiple wavelengths generated from a coherent light source, or from multiple light sources, also may be able to produce a set of superimposed interferograms that meet the requirements of the method described herein. As long as the phase shifts between any adjacent frames are known, any individual interferogram from a set of superimposed interferograms can be extracted.

Unlike most algorithms in PSI, constant phase shifts between adjacent frames for each individual interferogram are not required. The method employed in the preferred embodiment of this invention minimizes phase calculation errors resulting from errors in phase shifts by dynamically changing the weights used in a weighted least-square fitting technique.

Reference again should be made to FIG. 1. As noted above, three interferograms are superimposed in the recording plane at the CCD camera 30. One of these is related to the OPD between the front surface 24 and the reference flat 20. Another is related to the OPD between the back surface 26 and the reference flat 20; and the third is related to the OPD between the front surface 24 and the back surface 26.

The transparent plate or object 22 is positioned in the interferometer, such that the OPD between the front surface 24 and the reference flat 20 is twice the OPD between the front surface 24 and the back surface 26 of the object 22. Consequently, before placing the object 22 in position, a non-transparent flat (not shown) is located with its front surface at the location of the front surface 24 shown in FIG. 1. With such a non-transparent flat, only one interferogram appears at the recording plane for this object. The phase shifts of this interferogram (with the non-transparent plate) then are calibrated at 90° shifts between adjacent frames. After this is done, the measuring object 22 is positioned to locate the surface 24 at the same surface as the one used in the calibration.

A number of frames (for example, seventeen or so) of superimposed interferograms on the recording plane at the camera 30 then are acquired, while the wavelength of the laser diode 12 is changed. The three interferograms recorded in this setup have different phase shift speeds. The phase shift speed of any given interferogram is proportional to its corresponding OPD between the reflective surface (such as 24 or 26) and the reference flat 20, or between the two reflective surfaces 24 and 26. Care is taken to position the object 22 relative to the reference surface 20, such that the phase shift speeds of all of the individual interferograms are separated on the recording plane at the camera 30. The different phase shift speeds which exist in the example under consideration are 45° per frame for the thickness (the distance between the surfaces 24 and 26), 90° per frame for the front surface 24, and 135° per frame for the back surface 26.

The fringe pattern obtained from a Twyman-Green or a Fizeau interferometer for a single test surface can be expressed as:

$$g(x, y) = a_0(x, y) + a_1(x, y)\cos\left[\frac{2\pi}{\lambda}L(x, y)\right], \quad (1)$$

where g(x,y) is the intensity at a pixel positioned at point (x,y), $a_0(x,y)$ is the background, $a_1(x,y)$ is the modulation, and L is the optical path difference of the testing surface and the reference mirror. If a tunable laser is used by the interferometer to change the wavelength from $\lambda$ to $\lambda - \lambda_m$, the intensity of the interferogram becomes $$g_m(x, y) = a_0(x, y) + a_1(x, y)\cos\left[\frac{2\pi}{\lambda - \Delta\lambda_m}L(x, y)\right]. \quad (2)$$

This can be rewritten as:

$$g_m(x, y) = a_0(x, y) + a_1(x, y)\cos\left[\frac{2\pi}{\lambda}L(x, y) + \frac{2\pi L(x, y)\Delta\lambda_m}{\lambda(\lambda - \Delta\lambda_m)}\right]. \quad (3)$$

Omitting (x,y) for convenience, Equation (3) can be rewritten as:

$$g_m = a_0 + a_1 \cos(\Phi + \theta_m), \quad (4)$$

where $g_m$ is the mth acquisition of the interferogram, the phase $$\Phi = \frac{2\pi}{\lambda} L(x, y)$$

and the mth phase shift $$\theta_m = \frac{2\pi L(x, y) \Delta\lambda_m}{\lambda(\lambda - \Delta\lambda_m)}.$$

To extract the phase $\phi$, a series of interferograms are recorded by changing the wavelength. The wavelength shift $\Delta\lambda_m$ (m=1,2, . . . n) is carefully calibrated or measured such that the phase shifts between any adjacent interferograms are known. For example, the phase shifts are a constant, i.e. $\theta_m - \theta_{m-1}$ = constant. Please note that the relationship between the phase shift $\Theta_m$ and the wavelength shift $\Delta\lambda_m$ is not linear.

If more than one test surface is present, multiple interferograms will be superimposed in the recording plane at the camera 30. Similar to Equation (4) for only one interferogram, the intensity for p superimposed interferograms can be expressed as:

$$g_m = a_0 + \sum_{j=1}^{p} a_j \cos(\Phi_j + \theta_{jm}), \quad (5)$$

where $g_m$ is the mth acquisition of the superimposed interferograms, $a_0$ is the background, $a_1(x,y)$ is the modulation of the jth interferogram, $\Phi$ is the phase of jth interferogram related to optical path difference of the testing surface and the reference mirror or the optical path difference between testing surfaces and $\theta_{jm}$ is the mth phase shift for jth interferogram.

Equation (5) can be written as:

$$g_m = \sum_{k=0}^{2p} x_k \phi_k(m), \quad (6)$$

where $x_0 = a_0$, $x_{2j-1} = a_1 \cos \Phi_j$, $x_{2j} = a_j \sin \Phi_1$, $\phi_0 = 1$, $\phi_{2j-1}(m) = \cos \theta_{jm}$, and $\phi_{2j}(m) = \sin \theta_{jm}$ for j=1,2, . . . , p.

If $I_m$ represents the actual intensity recorded at the detector point, and at a known phase shift, the phases for all interferograms can be determined simultaneously by the least-square technique. With the weight $w_m$, m=1,2, . . . n, the error function E may be defined as:

$$E(x_0, x_1, \ldots, x_{2p}) = \sum_{m=1}^{n} w_m (I_m - g_m)^2 = \sum_{m=1}^{n} w_m \left(I_m - \sum_{k=0}^{2p} x_k \phi_k(m)\right)^2. \quad (7)$$

The minimum of E occurs where the derivative of E with respect to all $x_k$(k=0,1,2, . . . , $x_{2p}$) vanishes. These conditions yield the following equations:

$$\sum_{k=0}^{2p} x_k \sum_{m=1}^{n} w_m \phi_k(m) \phi_j(m) = \sum_{m=1}^{n} w_m I_m \phi_j(m) \quad \text{for } j = 0, 1, 2, \ldots, 2p. \quad (8)$$

This is:

$$A X = Y, \quad (9)$$

where $$A_{jk} = \sum_{m=1}^{n} w_m \phi_j(m) \phi_k(m), \, X_j = x_j, \text{ and } Y_j = \sum_{m=1}^{n} w_m I_m \phi_j(m) \quad (10)$$

Solving Equation (9) for X, the phases then are calculated by:

$$\Phi_j = \tan^{-1} \frac{x_{2j}}{x_{2j-1}} \quad \text{for } j = 1, 2, \ldots p. \quad (11)$$

The phase shift between adjacent intensity frames for any interferogram, i.e. $\theta_{jm} - \theta_{j(m-1)}$ (m=2, . . . n), is not required to be a constant, as long as the values are known.

Now consider the measurement of a transparent parallel plate. For this case, there are three interferograms superimposed at the detector plane (camera 30), as described above. They are related to the relative deviation of the front surface to the reference plane, the relative deviation of the rear surface to the reference plane, and the thickness of the transparent plate. The matrixes in Equation (9) become:

$$A = \begin{bmatrix} \sum w_m & \sum w_m c_1 & \sum w_m s_1 & \sum w_m c_2 & \sum w_m s_2 & \sum w_m c_3 & \sum w_m s_3 \\ \sum w_m c_1 & \sum w_m c_1^2 & \sum w_m s_1 c_1 & \sum w_m c_2 c_1 & \sum w_m s_2 c_1 & \sum w_m c_3 c_1 & \sum w_m s_3 c_1 \\ \sum w_m s_1 & \sum w_m c_1 s_1 & \sum w_m s_1^2 & \sum w_m c_2 s_1 & \sum w_m s_2 s_1 & \sum w_m c_3 s_1 & \sum w_m s_3 s_1 \\ \sum w_m c_2 & \sum w_m c_1 c_2 & \sum w_m s_1 c_2 & \sum w_m c_2^2 & \sum w_m s_2 c_2 & \sum w_m c_3 c_2 & \sum w_m s_3 c_2 \\ \sum w_m s_2 & \sum w_m c_1 s_2 & \sum w_m s_1 s_2 & \sum w_m c_2 s_2 & \sum w_m s_2^2 & \sum w_m c_3 s_2 & \sum w_m s_3 s_2 \\ \sum w_m c_3 & \sum w_m c_1 c_3 & \sum w_m s_1 c_3 & \sum w_m c_2 c_3 & \sum w_m s_2 c_3 & \sum w_m c_3^2 & \sum w_m s_3 c_3 \\ \sum w_m s_3 & \sum w_m c_1 s_3 & \sum w_m s_1 s_3 & \sum w_m c_2 s_3 & \sum w_m s_2 s_3 & \sum w_m c_3 s_3 & \sum w_m s_3^2 \end{bmatrix}, \quad (12)$$

$$X = \begin{bmatrix} a_0 \\ a_1\cos\Phi_1 \\ a_1\sin\Phi_1 \\ a_2\cos\Phi_2 \\ a_2\sin\Phi_2 \\ a_3\cos\Phi_3 \\ a_3\sin\Phi_3 \end{bmatrix}, \text{ and } Y = \begin{bmatrix} \sum w_m I_m \\ \sum w_m I_m c_1 \\ \sum w_m I_m s_1 \\ \sum w_m I_m c_2 \\ \sum w_m I_m s_2 \\ \sum w_m I_m c_3 \\ \sum w_m I_m s_3 \end{bmatrix}.$$

where $c_1 = \cos\theta_{1m}, s_1 = \sin\theta_{1m},$ $c_2 = \cos\theta_{2m}, s_2 = \sin\theta_{2m},$ $c_3 = \cos\theta_{3m}, s_3 = \sin\theta_{3m}.$ These definitions are, in fact, identical to the matrixes reported in the above mentioned Okada article, if $w_m = 1$ for $m = 1, 2, \ldots, n$. The phases $\Phi_1$, $\Phi_2$, and $\Phi_3$ can be obtained after solving the above equations for X.

To separate the underlying phase of each interferogram for multiple superimposed interferograms in this application, however, any solution element $x_j$ must be "independent" of the others. In other words, any coordinate $x_j$ must not include any "projections" from any other coordinates. In this way, any phase derived from the solution x corresponds to a given interferogram only. Therefore, weights $w_m$ are introduced to transfer basis from $\{\phi_0, \phi_1, \ldots, \phi_{2p}\}$ to to $\{\Phi_0, \Phi_1, \ldots, \Phi_{2p}\}$ where $$\Phi_i(m) = \sqrt{w_m}\phi_i(m), \text{ for } m = 1, 2, \ldots, n \quad (13)$$

The orthogonality requirements for the new basis $\{\Phi_0, \Phi_1, \ldots, \Phi_{2p}\}$ yield $$\sum_{m=1}^{n} w_m \phi_j(m)\phi_k(m) = \begin{cases} 0, & \text{if } j \neq k \\ a_j \neq 0, & \text{if } j = k. \end{cases} \quad (14)$$

That is $$A_{jk} = \begin{cases} 0, & \text{if } j \neq k \\ a_j \neq 0, & \text{if } j = k. \end{cases} \quad (15)$$

More conditions may be required, such as:

$$\sum_{m=1}^{n} w_m = 1. \quad (16)$$

Solving equations generated by Equation (15) and Equation (16), the weights $w_m$, $m = 1, 2, \ldots n$ are obtained.

Every vector from the vector set $\{\phi_0, \phi_1, \ldots, \phi_{2p}\}$ is directly related to cosine/sine of the phase shift for one of the interferograms. In other words, these vectors are known once the measurement system setup, such as the cavity length of the front surface, the thickness of the measuring plate, the number of superimposed interferograms and the laser wavelength is determined. Therefore, weights $w_m$, $m = 1, 2, \ldots n$, can be dynamically determined during each measurement. For example, a wavelength tunable laser Fizeau interferometer, as shown in FIG. 1, is used to measure a transparent parallel plate 22. Assume the front surface 24 to the reference plane 20 is 9 mm. The thickness of the transparent plate is 3 mm. The refractive index of the plate is 1.5. Also assume seventeen interferograms are acquired with a π/2 phase shift difference between any adjacent intensity frames. The weights derived from Equation (A9) and (A10) are W=[0.0067, 0.0156, 0.0313, 0.0469, 0.0626, 0.0781, 0.0938, 0.1094, 0.1116, 0.1094, 0.0937, 0.0781, 0.0625, 0.0969, 0.0312, 0.0156, 0.0067]. If nineteen interferograms are acquired in the same setup, the weights derived from Equation (A9) and (A10) become W=[0.0021, 0.0078, 0.0178, 0.0313, 0.0469, 0.0625, 0.0781, 0.0937, 0.1051, 0.1093, 0.1051, 0.0937, 0.0781, 0.0625, 0.0469, 0.0313, 0.0178, 0.0078, 0.0021].

With weights $w_m (m = 1, 2, \ldots n)$ selected properly, the weighted least-square approach for simultaneous measurement of multiple surfaces, thickness and refractive index inhomogeniety is superior to an unweighted approach. To further demonstrate the advantages, consider the following example: a wavelength tunable laser Fizeau interferomoeter is used to measure a transparent parallel plate. The front surface to the reference plane is 9 mm. The thickness of the transparent plate is 3 mm. The refractive index of the plate is 1.5. Seventeen interferograms are taken with a π/2 phase shift difference between any adjacent intensity frames for the front interferogram. Solving Equation (12) with all weight $w_m = 1$, $(m = 1, 2, \ldots n)$, we obtain the following formula for calculating the front surface phase:

$$\Phi_1 = \tan^{-1} \frac{0.125 S_1}{0.08657 C_1 + 0.005435 C_2 + 0119565 C_3 + 0.130435 C_4} \quad (13)$$

where $S_1 = I_2 - I_4 + I_6 - I_8 + I_{10} - I_{12} + I_{14} - I_{16},$ $C_1 = I_1 + I_9 + I_{17},$ $C_2 = -I_2 - I_4 - I_6 - I_8 - I_{10} - I_{12} - I_{14} - I_{16},$ $C_3 = -I_3 - I_7 - I_{11} - I_{15},$ $C_4 = I_5 + I_{13}.$ Solving Equation (12) with weights W=[0.0067, 0.0156, 0.0313, 0.0469, 0.0626, 0.0781, 0.0938, 0.1094, 0.1116, 0.1094, 0.0937, 0.0781, 0.0625, 0.0969, 0.0312, 0.0156, 0.0067], we obtain the following formula for calculating the phase related to the front surface:

$$\Phi_1 = \tan^{-1} \frac{0.03125 S_1 + 0.09375 S_2 + 0.15625 S_3 + 0.21875 S_4}{0.01336 C_1 + 0.0625 C_2 + 0.125 C_3 + 0.1875 C_4 + 0.22329 I_9} \quad (14)$$

where $$S_1 = I_2 - I_{16}, S_2 = -I_4 + I_{14}, S_3 = I_6 + I_{12}, S_4 = -I_8 + I_{10},$$

$$C_1 = I_1 + I_{17}, C_2 = -I_3 - I_{15}, C_3 = I_5 + I_{13}, C_4 = -I_7 - I_{11}.$$

Equation (13) is inferior to Equation (14) since it is more sensitive to phase shifting errors and various harmonics in the signal. This conclusion can be visualized through the Fourier representation of these algorithms.

Figure 3:
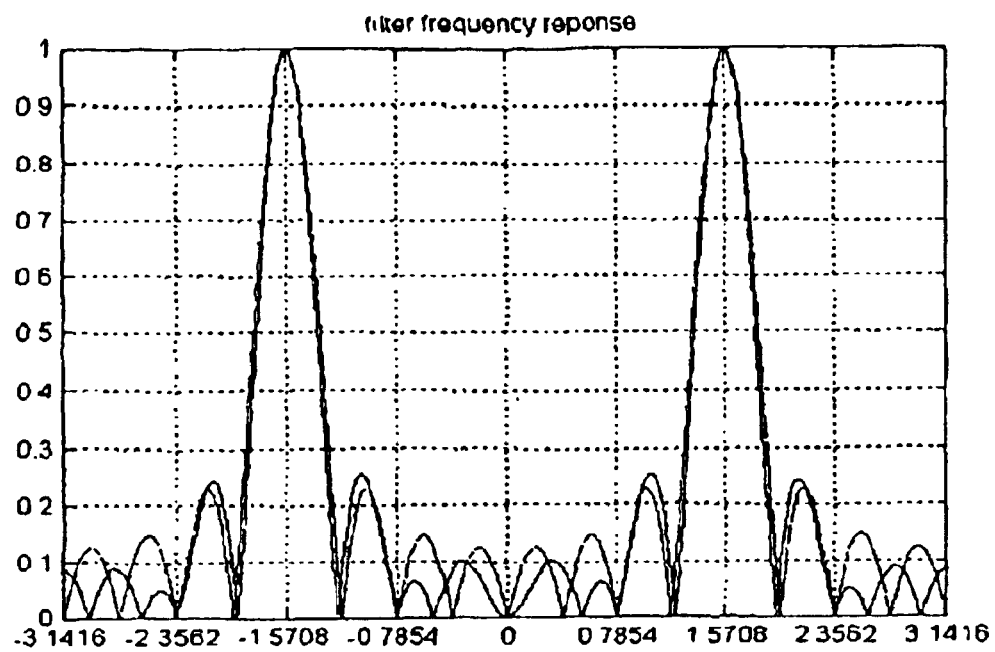
FIG. 3 is a the plot of the filter functions for a prior art un-weighted least-square algorithm.
Figure 4:
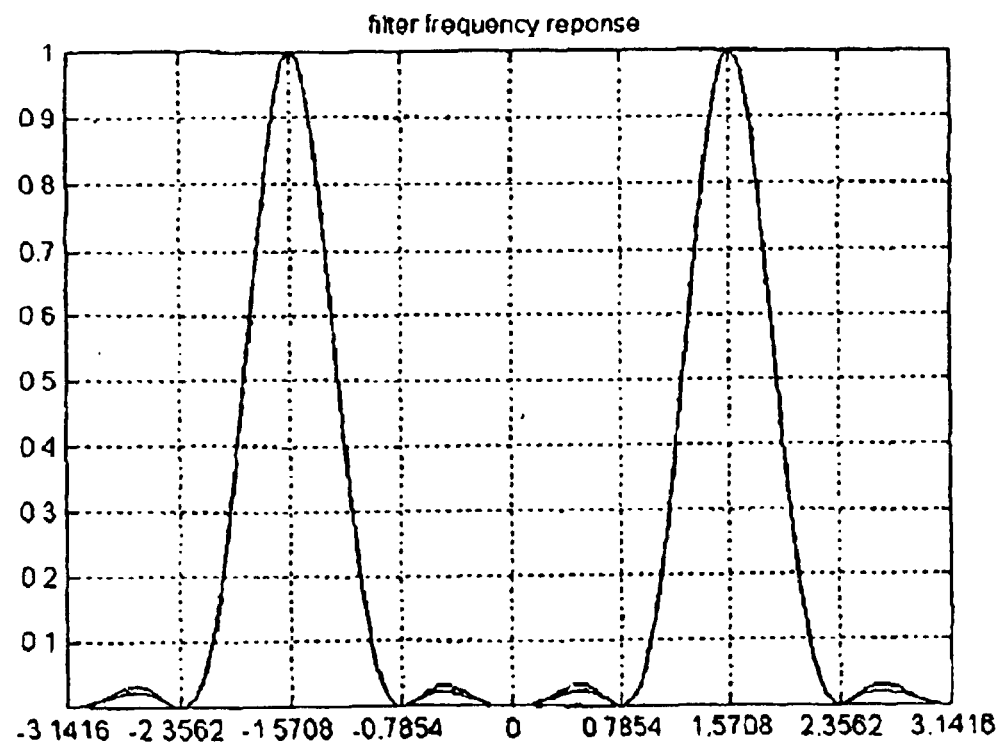
FIG. 4 is the plot of the filter functions for a weighted least-square algorithm in accordance with the preferred embodiment of the invention.

A general express for N-frame phase shifting algorithms is:

$$\Phi = \tan^{-1} \frac{\sum_{k=0}^{N-1} w_n(k) I_k}{\sum_{k=0}^{N-1} w_d(k) I_k}, \quad (15)$$

where $w_n(k)$ and $w_d(k)$ are the weight for the kth frame, and $I_k$ is the intensity of kth interferogram. By Parseva's theroem, the phase estimation can be rewritten as:

$$\Phi = \tan^{-1} \frac{\int_{-\pi}^{\pi} F_n(\omega) F_I(\omega) d\omega}{\int_{-\pi}^{\pi} F_d(\omega) F_I(\omega) d\omega}, \quad (16)$$

where $F_n(w)$, $F_d(w)$, and $F_I$ are the Fourier transforms of $w_n(k)$, $w_d(k)$ and $I_k$, respectively. Refer $F_n(w)$ and $F_d(w)$ as filter functions since they are able to filter out certain frequency components of the signal. The filter functions $F_n(w)$ and $F_d(w)$ of Equation (13) and Equation (14) are shown in FIG. 3 and FIG. 4, respectively. FIG. 3 shows the filter functions for the unweighted least-square algorithm and FIG. 4 shows the filter functions for the weighted least-square algorithm of the preferred embodiment of the invention.

The method of the preferred embodiment of weighted least-square measurement as described above is able to generate a set of optimal weights (in the least-square sense) with any available intensity frames acquired to make the basis for the least-square fitting orthogonal. Even if a basis with all of the weights obtained from the method of this invention is not orthogonal, in case the number of intensity frames is too small, the basis is still a best basis which is closest to the orthogonal basis with the available intensity frames used. The result of this is that the above method is capable of minimizing the errors resulting from only a limited number of intensity frames acquired from an interferometer. For example, the limit of wavelength change in the light source limits the number of intensity frames which can be acquired to meet the requirement of the method. For a thinner transparent plate 22, or two reflective surfaces very close to each other, more intensity frames may be required to separate the interferograms than the measurement system can provide.

The method described above, using a weighted least-square algorithm, is able to provide the best results possible for exacting the phases from any individual interferograms. For example, for the measurement of two reflective surfaces close to one another, prior art systems such as those discussed in the background portion of this application, may require over one hundred frames of acquisition to provide the desired profile. The system and method described above is capable of providing an accurate profile using between 10 to 30 frames for similar thin transparent plates or closely oriented reflective surfaces. As a consequence, accurate measurements may be obtained more quickly, and, for extremely thin objects, the above method may be the only method capable of obtaining the desired profile or mapping.

In summary, the method and system of the above disclosed preferred embodiment of the invention has the advantages of obtaining the phase of any given interferogram, free from errors resulting from the existence of all other interferograms, but taking advantages of an orthogonal basis. Secondly, the method and system does not require the phase shifts between adjacent interferograms to be constant provided their values are known. In addition, phases of every individual interferogram are simultaneously extracted by use of the weighted least-square fitting method described. In addition, a set of optimal weights is dynamically generated to provide the best basis for separating each individual interferogram. The method also is capable of measuring an object with multiple reflective surfaces; and the measurement range of an interferometer is extended by providing an ability to extract phases from a smaller set of intensity frames.

The foregoing description of a preferred embodiment of the invention is to be considered illustrative and not as limiting. Various changes and modifications will occur to those skilled in the art for performing substantially the same function, in substantially the same way, to achieve substantially the same result without departing from the true scope of the invention as defined in the appended claims.

What is claimed is:

1. A method for obtaining mapping profiles of transparent objects having a plurality of reflective surfaces including the steps of:

placing a transparent object having a plurality of reflective surfaces in an unequal path interferometer a predetermined distance from a reference surface;

supplying coherent light from a tunable source and passing the light to the reference surface and to the object;

simultaneously recording multiple optical interferograms for each of the plurality of reflective surfaces of the transparent object in response to known phase shifts produced by changes in the wavelength of light from the tunable source; and simultaneously extracting phases of each of the interferograms for each of the plurality of reflective surfaces to produce a phase map for each interferogram using a weighted least-square algorithm.

2. The method according to claim 1 wherein the weighted least-square algorithm functions to provide an orthogonal least-square fitting.

3. A method according to claim 2 wherein the weighted least-square algorithm with N-frame acquisition for p superimposed interferograms is an algorithm corresponding to:

$$\Phi_j = \tan^{-1} \frac{x_{2j}}{x_{2j-1}} \quad \text{for} \quad j = 1, 2, \ldots p.$$

where $x_{2j}$ and $x_{2j-1}$ are two elements of the solution $$\sum_{k=0}^{2p} x_k \sum_{m=1}^{n} w_m \phi_k(m) \phi_j(m) = \sum_{m=1}^{n} w_m I_m \phi_j(m) \quad \text{for} \quad j = 0, 1, 2, \ldots, 2p.$$

4. The method according to claim 3 further including the step of dynamically changing the weights used in the least-square algorithm.

5. The method according to claim 4 wherein the step of simultaneously extracting phases of each of the interferograms is effected by a computer.

6. The method according to claim 5 wherein the step of simultaneously recording the multiple optical interferograms is effected by means of a CCD camera.

7. The method according to claim 6 wherein the unequal path interferometer is a Fizeau interferometer.

8. The method according to claim 6 wherein the unequal path interferometer is a Twyman-Green interferometer.

9. The method according to claim 1 further including the step of dynamically changing the weights used in the least-square algorithm.

10. The method according to claim 9 wherein the weighted least-square algorithm functions to provide an orthogonal least-square fitting.

11. A method according to claim 10 wherein the weighted least-square algorithm with N-frame acquisition for p superimposed interferograms is an algorithm corresponding to:

$$\Phi_j = \tan^{-1} \frac{x_{2j}}{x_{2j-1}} \quad \text{for } j = 1, 2, \ldots p.$$

where $x_{2j}$ and $x_{2j-1}$ are two elements of the solution $$\sum_{k=0}^{2p} x_k \sum_{m=1}^{n} w_m \phi_k(m) \phi_j(m) = \sum_{m=1}^{n} w_m I_m \phi_j(m) \quad \text{for } j = 0, 1, 2, \ldots, 2p.$$

12. The method according to claim 1 wherein the step of simultaneously recording the multiple optical interferograms is effected by means of a CCD camera.

13. The method according to claim 1 wherein the step of simultaneously extracting phases of each of the interferograms is effected by a computer.

14. The method according to claim 1 wherein the unequal path interferometer is a Fizeau interferometer.

15. The method according to claim 1 wherein the unequal path interferometer is a Twyman-Green interferometer.

16. A system for producing mapping profiles of transparent objects having a plurality of reflective surfaces including in combination:
 a tunable coherent light source;
 an unequal path length interferometer having a reference surface and adapted to support a transparent object having a plurality of reflective surfaces to receive light from the tunable light source and to produce simultaneous optical interferograms;
 a recorder positioned to simultaneously record the multiple optical interferograms for each of the plurality of reflective surfaces of the transparent object; and
 computer means coupled with the tunable light source for changing the wavelength of light emitted by the light source and further coupled with the recorder for extracting phases of each of the interferograms for each of the plurality of reflective surfaces to produce a phase map for each interferogram using a weighted least-square algorithm in the computer.

17. The system according to claim 16 wherein the tunable light source is a tunable laser.

18. The system according to claim 17 wherein the weighted least-square algorithm generates a set of optimal weights dynamically to provide the ideal basis for separating each of the individual interferograms from one another.

19. The system according to claim 18 wherein the weighted least-square algorithm with N-frame acquisition for p superimposed interferograms is an algorithm corresponding to:

$$\Phi_j = \tan^{-1} \frac{x_{2j}}{x_{2j-1}} \quad \text{for } j = 1, 2, \ldots p.$$

where $x_{2j}$ and $x_{2j-1}$ are two elements of the solution $$\sum_{k=0}^{2p} x_k \sum_{m=1}^{n} w_m \phi_k(m) \phi_j(m) = \sum_{m=1}^{n} w_m I_m \phi_j(m) \quad \text{for } j = 0, 1, 2, \ldots, 2p.$$

20. The system according to claim 19 wherein the interferometer is a Fizeau interferometer.

21. The system according to claim 19 wherein the interferometer is a Twyman-Green interferometer.

22. The system according to claim 16 wherein the weighted least-square algorithm generates a set of optimal weights dynamically to provide the ideal basis for separating each of the individual interferograms from one another.

23. The system according to claim 22 wherein the weighted least-square algorithm with N-frame acquisition for p superimposed interferograms is an algorithm corresponding to:

$$\Phi_j = \tan^{-1} \frac{x_{2j}}{x_{2j-1}} \quad \text{for } j = 1, 2, \ldots p.$$

where $x_{2j}$ and $x_{2j-1}$ are two elements of the solution $$\sum_{k=0}^{2p} x_k \sum_{m=1}^{n} w_m \phi_k(m) \phi_j(m) = \sum_{m=1}^{n} w_m I_m \phi_j(m) \quad \text{for } j = 0, 1, 2, \ldots, 2p.$$

24. The system according to claim 16 wherein the interferometer is a Fizeau interferometer.

25. The system according to claim 16 wherein the interferometer is a Twyman-Green interferometer.

26. The system according to claim 16 wherein the weighted least-square algorithm with N-frame acquisition for p superimposed interferograms is an algorithm corresponding to:

$$\Phi_j = \tan^{-1} \frac{x_{2j}}{x_{2j-1}} \quad \text{for } j = 1, 2, \ldots p.$$

where $x_{2j}$ and $x_{2j-1}$ are two elements of the solution $$\sum_{k=0}^{2p} x_k \sum_{m=1}^{n} w_m \phi_k(m) \phi_j(m) = \sum_{m=1}^{n} w_m I_m \phi_j(m) \quad \text{for } j = 0, 1, 2, \ldots, 2p.$$

* * * * *